(12) United States Patent
Chang

(10) Patent No.: US 7,463,315 B2
(45) Date of Patent: Dec. 9, 2008

(54) LIGHT COUPLING STRUCTURE ON LIGHT GUIDE PLATE IN A BACKLIGHT MODULE

(75) Inventor: Yi-Hui Chang, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 603 days.

(21) Appl. No.: 10/799,502

(22) Filed: Mar. 11, 2004

(65) Prior Publication Data

US 2005/0200773 A1   Sep. 15, 2005

(51) Int. Cl.
*G02F 1/1335* (2006.01)
*G09G 3/36* (2006.01)

(52) U.S. Cl. .......................... 349/61; 349/62; 345/102

(58) Field of Classification Search .......... 349/60–65; 362/26, 31, 551, 555, 561, 612; 345/82, 345/46, 102

See application file for complete search history.

(56) References Cited

U.S. PATENT DOCUMENTS

| | | | | |
|---|---|---|---|---|
| 5,396,350 A | * | 3/1995 | Beeson et al. | 349/62 |
| 5,479,328 A | * | 12/1995 | Lee et al. | 362/216 |
| 5,528,709 A | * | 6/1996 | Koike et al. | 385/14 |
| 5,598,280 A | * | 1/1997 | Nishio et al. | 349/57 |
| 6,095,656 A | * | 8/2000 | Shimura et al. | 362/97 |
| 6,227,669 B1 | * | 5/2001 | Tiao et al. | 353/31 |
| 6,330,111 B1 | * | 12/2001 | Myers | 359/599 |
| 6,715,901 B2 | * | 4/2004 | Huang | 362/294 |
| 6,924,856 B2 | * | 8/2005 | Okumura et al. | 349/96 |
| 6,975,370 B2 | * | 12/2005 | Yu et al. | 349/65 |
| 7,081,933 B2 | * | 7/2006 | Yu et al. | 349/62 |
| 2002/0135553 A1 | * | 9/2002 | Nagai et al. | 345/89 |
| 2003/0147055 A1 | * | 8/2003 | Yokoyama | 353/98 |
| 2003/0206408 A1 | * | 11/2003 | Funamoto et al. | 362/31 |
| 2004/0100664 A1 | * | 5/2004 | Onishi et al. | 358/475 |
| 2004/0125615 A1 | * | 7/2004 | Ho | 362/560 |
| 2004/0130515 A1 | * | 7/2004 | Chuang et al. | 345/82 |
| 2004/0130883 A1 | * | 7/2004 | Leu et al. | 362/31 |
| 2005/0041178 A1 | * | 2/2005 | Taniguchi et al. | 349/65 |
| 2005/0073495 A1 | * | 4/2005 | Harbers et al. | 345/102 |

FOREIGN PATENT DOCUMENTS

| | | | |
|---|---|---|---|
| CN | 2599602 | | 1/2004 |
| JP | 11-249134 | * | 3/1998 |
| JP | 11-052370 | * | 2/1999 |
| JP | 2001-23423 | | 1/2001 |
| JP | 2004047297 A | * | 2/2004 |
| JP | 2005038643 A | * | 2/2005 |
| KR | 2002-071358 | * | 9/2002 |

* cited by examiner

*Primary Examiner*—Mike Qi
(74) *Attorney, Agent, or Firm*—Liu & Liu

(57) ABSTRACT

An apparatus of a backlight module and a liquid crystal display. The apparatus includes a plurality of point light sources and a light guide plate. The plurality of point light sources is positioned on a base plate. The light guide plate has a first surface and a second surface parallel to the first surface. The first surface of the light guide plate has a plurality of convex structures corresponding to the point light sources, every convex structure has a distal end portion, and an arc-shaped recess formed therein.

24 Claims, 5 Drawing Sheets

US 7,463,315 B2

LIGHT COUPLING STRUCTURE ON LIGHT GUIDE PLATE IN A BACKLIGHT MODULE

BACKGROUND OF THE INVENTION

1. Field of the Invention

The present invention relates to a backlight module and especially a backlight module for use in a liquid crystal display (LCD) device.

2. Description of the Related Art

Recently, liquid crystal displays (LCD) have replaced cathode ray tube (CRT) displays in the mainstream market, due to lower output radiation and thin profile. Generally speaking, cold cathode fluorescent lamps (CCFLs) are used as light sources in traditional LCD backlight modules.

FIG. 1 shows an exploded view of the traditional backlight module. The backlight module is disposed below an LCD panel 14. The traditional backlight module includes a reflector 10, a plurality of CCFLs 11, a light guide plate 12, and a diffusion sheet 13. FIG. 2 is a combined view. Light emitted by the CCFL is bounces off the reflector 10 and exits the backlight module through the diffusion sheet 13 providing light to the LCD panel 14.

In conventional backlight modules, a gap exists between the lamps 11 and the light guide plate 12 to increase uniformity of emitted light, resulting in increased thickness of the entire backlight module. Further, overall brightness is altered with respect to disposition of the lamps on the light guide plate 12 adjacent to the liquid crystal panel, resulting in a bright and dark line changes. To prevent this problem, a diffusion sheet with high brume must be employed, this, however, results in reduced illumination.

SUMMARY OF THE INVENTION

Accordingly, an object of the invention is to provide an apparatus of a backlight module, the backlight module includes a plurality of point light sources and a light guide plate. The plurality of point light sources is positioned on a base plate. The light guide plate has a first surface and a second surface parallel to the first surface. The first surface of the light guide plate has a plurality of convex structures corresponding to the point light sources, every convex structures has a distal end portion, and an arc-shaped recess is formed at the distal end portion of the convex structure.

The light guide plate with convex structures using LEDs as a light source, of the present invention eliminates the distance between the LEDs and the light guide plate, thus reducing the thickness of the entire backlight module. Additionally, brightness uniformity increases, and a diffusion sheet with lower diffusivity can be used, thus increasing illumination intensity over the entire diffusion sheet.

A detailed description is given in the following embodiments with reference to the accompanying drawings.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

Figure 1:
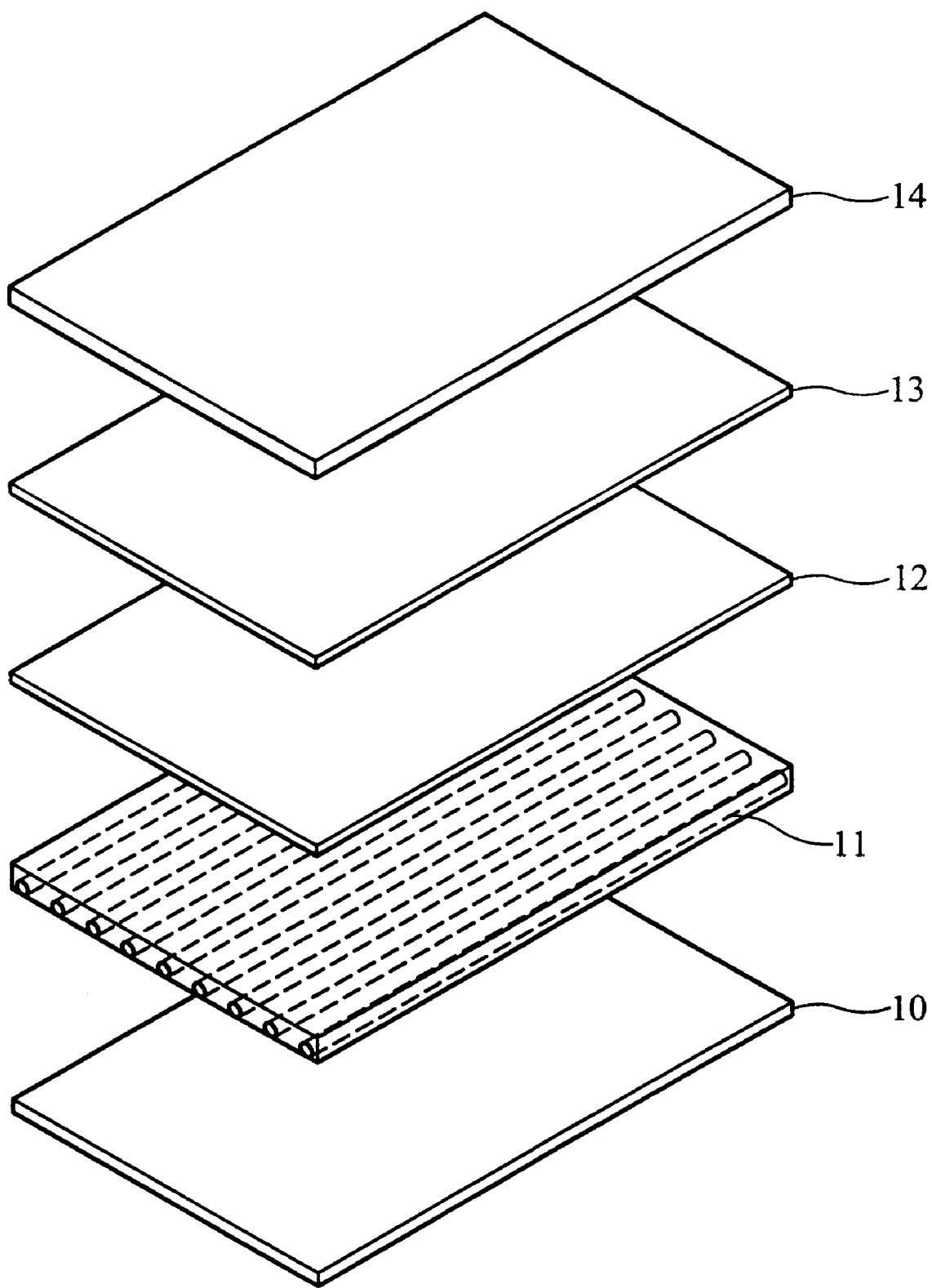
FIG. 1 shows an exploded view of the traditional backlight module.
Figure 2:
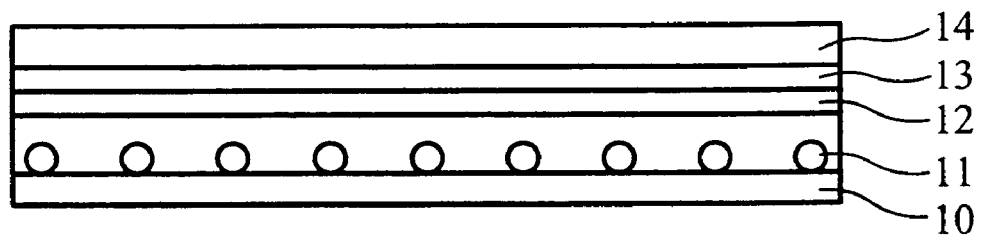
FIG. 2 is a combination view of the traditional backlight module.
Figure 3:
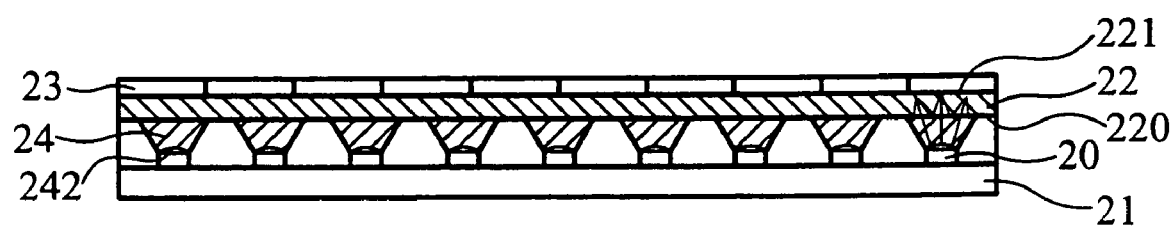
FIG. 3 is a cross section view of the present invention.

FIG. 3 is a cross-section of the present invention. In the present invention, the backlight module includes plurality of LEDs 20 and a light guide plate 22.

Figure 4:
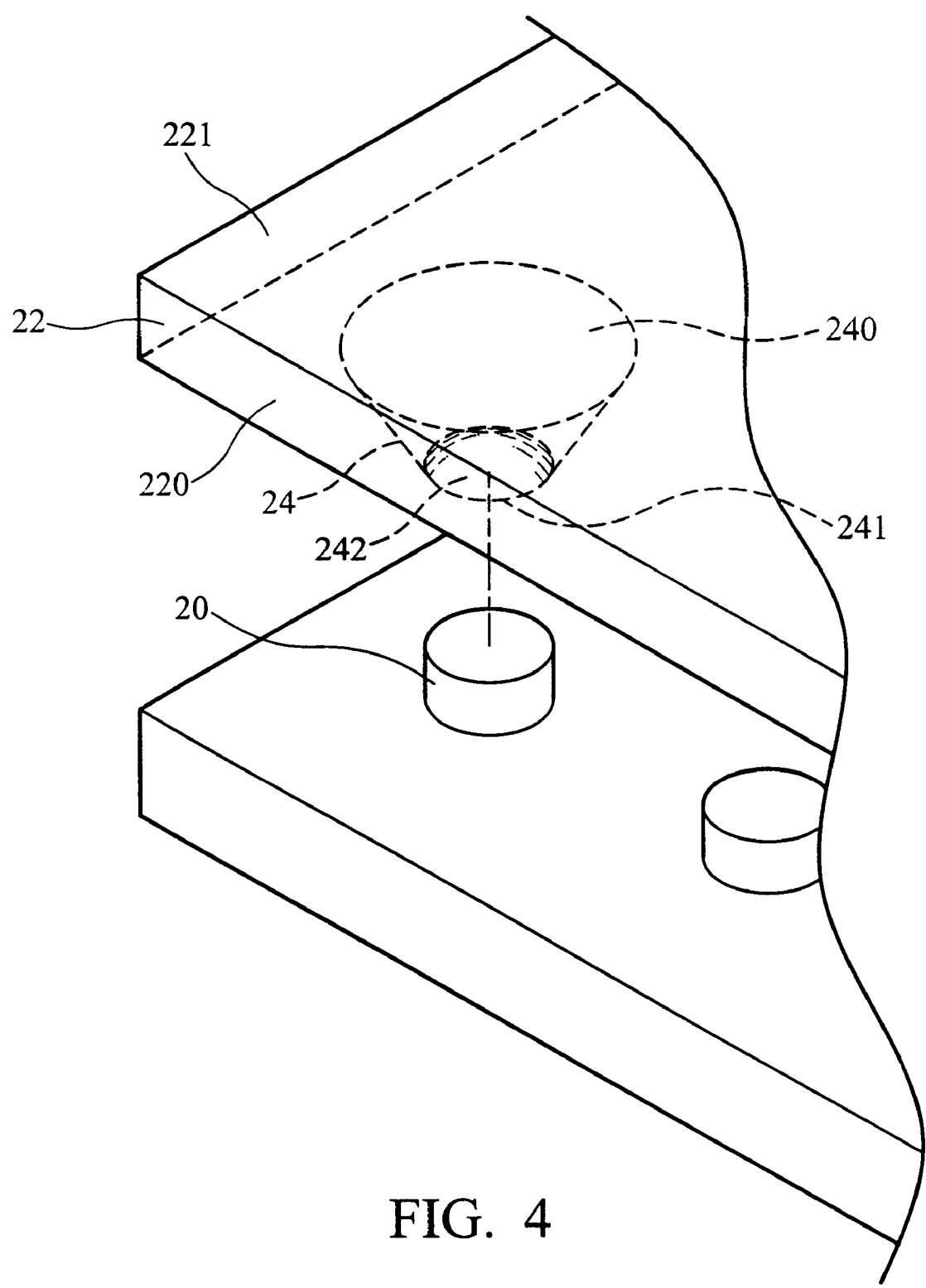
FIG. 4 is a partially enlarged view illustrating a convex structure of the backlight module of the present invention.

The LEDs 20 serve as point light sources and are arrayed on a base plate 21. The light guide plate 22 is made of polymethylmethacrylate (PMMA) or polycarbonate (PC) and has a first surface 220 and a second surface 221 parallel to the first surface 220. Wherein the first surface 220 has a plurality of convex structures 24 corresponding to the LEDs 20, as shown in Fig 4, the convex structure 24 is formed in a flat frustum shape or truncated cone shape, and the convex structure 24 has a proximal end portion 240 and a distal end portion 241, wherein the cross section area of the proximal end portion 240 is larger than the cross section area of the distal end portion 241. Furthermore, there is a dome-shaped recess 242 formed at the distal end portion 241 of the convex structure 24, to increase light diffusion uniformity. The light guide plate 22 also has a light guide pattern 23 (shown in Fig 3) on a second surface 221, which may be jagged or uneven. Thus emitted light reaches the first surface 220, enters the light-guide plate 22 through the second surface 221, and exits from the light guide pattern 23, the increasing brightness uniformity.

Figure 5A:
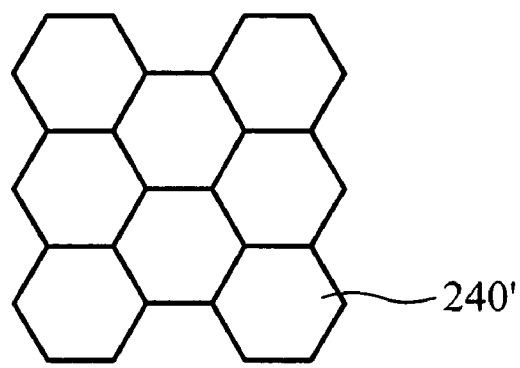
FIG. 5a is plan view illustrating a convex structure of the backlight module according to another embodiment of the present invention.
Figure 5B:
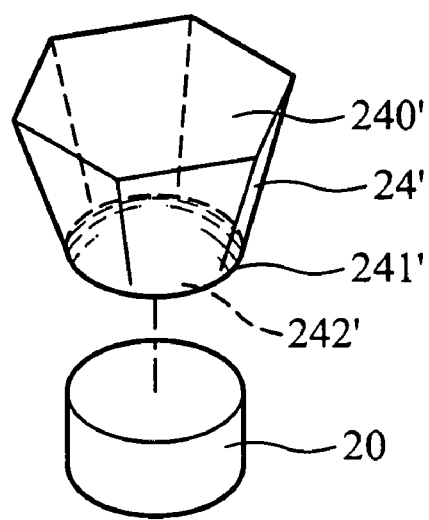
FIG. 5b is a perspective view showing the convex structure in FIG. 5a of the present invention.

As shown in Fig 4, the cross section of the proximal end portion 240 is circular, and the cross section of the distal end portion 241 is a smaller circle, in the invention, however, the shape of the cross section of the proximal end portion 240 or the distal end portion 241 can comprise other shapes, such as a hexagon-shape as shown in FIGS. 5a and 5b or other polygon-shapes.

Fig 5a and Fig 5b shows another embodiment of the convex structure 24', wherein the cross section of the proximal end portion 240' is hexagonal, the cross section of the distal end portion 241' is circular, and the section of the distal end portion is 241' is smaller than the proximal end portion 240'. There is also a dome-shaped recess 242' formed at the distal end portion 241' of the convex structure 24'.

Figure 6:
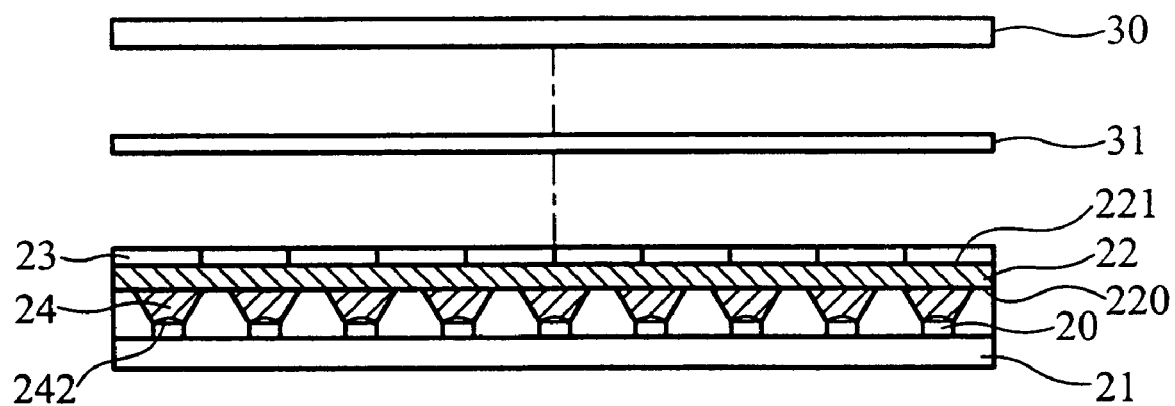
FIG. 6 is a plane view of the liquid crystal display device of the present invention.

FIG. 6 shows a perspective view of the liquid crystal display device 3 of the present invention. The liquid crystal display device 3 comprises a LCD panel 30, a diffusion sheet 31, a light guide plate 22, and a plurality of LEDs 20. Wherein the light guide plate 22 and the LEDs 20 are the same as previously described, hence their description is omitted here. The diffusion sheet 31 is disposed on the light guide plate 22, and the LCD panel 30 is disposed on the light guide plate 22. The diffusion sheet 31 increases brightness uniformity. Light emitted from the LEDs 20, reaches the light guide plate 22, enters the diffusion sheet 31, and exits the LCD panel 30.

As previously described, by using LEDs 20 as a light source and employing a convex structure 24 in the light guide plate, the distance between the LEDs and the light guide plate is redused or even eliminated, thereby reducing overall thickness, increasing brightness uniformity, reducing required diffusivity of the diffusion sheet and increasing illumination intensity over the entire diffusion sheet.

While the invention has been described by way of example and in terms of the preferred embodiments, it is as understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight device, comprising:
a two dimensional array of point light sources; and
a light guide plate comprising a first surface facing the array of point light sources and a second surface emitting light passing through the light guide plate, wherein the first surface comprises a two dimensional array of convex structures, with each convex structure aligned with a point light source in the array of point light sources, wherein each convex structure has a dome-shaped recess directly facing each point light source.

2. The backlight device as in claim 1, wherein the two dimensional array of convex structures comprises convex structures distributed uniformly in both dimensions on the first surface of the light guide plate.

3. The backlight device as in claim 1, wherein the two dimensional array of convex structures comprises convex structures distributed in a two dimensional matrix across plane of the first surface of the light guide plate.

4. The backlight device as in claim 1, wherein the first surface further comprises a planar surface from which the convex structures extend.

5. The backlight device as in claim 1, wherein each point light source is not entirely received in the corresponding dome-shaped recess of the convex structure.

6. The backlight device as in claim 1, wherein at least a portion of each point light sources remains outside the corresponding dome-shaped recess of the convex structure.

7. The backlight device as in claim 1, wherein the point light sources are positioned relative to the convex structures such that light emitted from the point light sources are substantially received through the convex structure.

8. The backlight device as in claim 7, wherein the point light sources are juxtaposed to the convex structure.

9. The backlight device as in claim 1, wherein the two dimensional array of point light source comprises a two dimensional array of LEDs.

10. The backlight device as in claim 9, wherein the two dimensional array of LEDs are supported on a back plate.

11. The backlight device as in claim 1, wherein the convex structure has at least one of a frustum shape or a truncated cone shape.

12. The backlight device as in claim 1, wherein the convex structure has a proximal end portion and a distal end portion directly facing a corresponding point light source in the array of point light sources, and wherein cross-section of the convex structure reduces in area from the proximal end portion to the distal end portion.

13. The backlight device as in claim 12, wherein the cross-section of the convex structure at the distal end portion is at least one of a circular shape, hexagon shape or another polygon shape.

14. The backlight device as in claim 12, wherein the cross-section of the convex structure at the proximal end portion is at least one of a circular shape, hexagon shape or another polygon shape.

15. The backlight device as in claim 14, wherein the point light sources are positioned relative to the convex structures such that light emitted from the point light sources are substantially received through the convex structure.

16. The backlight device as in claim 12, wherein the point light sources are juxtaposed to the distal end portion of the convex structure.

17. The backlight device as in claim 1, wherein the backlight device further comprises a diffusion sheet disposed adjacent the second surface.

18. The backlight device as in claim 1, wherein the second surface comprises a light guide pattern.

19. The backlight device as in claim 18, wherein the light guide pattern is at least one of jagged or uneven surface.

20. The backlight device as in claim 1, wherein material of the light guide plate comprises at least one of polymethylmethacrylate (PMMA), polycarbonate, or a combination thereof.

21. An LCD device, comprising:
a backlight device as in claim 1; and
an LCD panel positioned relative to the light emitting surface, receiving light emitted from the light emitting surface.

22. The LCD device as in claim 21, further comprising a diffusion sheet disposed between the LCD panel and the second surface of the backlight device.

23. A backlight device, comprising:
a two dimensional array of point light sources; and
a planar light guide plate comprising a first surface facing the array of point light sources and a second surface emitting light passing through the light guide plate, wherein the first surface comprises a two dimensional array of protrusions, with each protrusion aligning with a point light source in the array of point light sources, wherein each protrusion has a dome-shaped recess directly facing each point light source.

24. The backlight device as in claim 23, wherein the protrusions comprises convex structures.

* * * * *